United States Patent [19]

Davis

[11] Patent Number: 4,475,951

[45] Date of Patent: Oct. 9, 1984

[54] ENCAPSULATING SEALANT FOR THE TREATMENT AND PRESERVATION OF BUILDING MATERIALS

[75] Inventor: Lincoln R. Davis, Lincroft, N.J.

[73] Assignee: NOW Industries, Inc., Asbury Park, N.J.

[21] Appl. No.: 527,568

[22] Filed: Aug. 29, 1983

[51] Int. Cl.$^3$ ............................................. C04B 19/04
[52] U.S. Cl. ...................................................... 106/74
[58] Field of Search .......................................... 106/74

[56] References Cited

U.S. PATENT DOCUMENTS

| | | | |
|---|---|---|---|
| 3,854,987 | 12/1974 | Michael | 117/123 A |
| 4,059,553 | 11/1977 | Tohyama et al. | 260/29.6 S |
| 4,125,651 | 11/1978 | Campbell et al. | 427/372 B |

*Primary Examiner*—James Poer
*Attorney, Agent, or Firm*—Stephen W. White

[57] ABSTRACT

A coating composition particularly useful in sealing and protecting materials used in the construction of buildings and the like is described. This composition comprises a mixture of potassium silicates of varying viscosities catalyzed by a small amount of saturated borax solution. The composition described not only seals and protects the surface and interior of the building materials, but is particularly useful in the treatment of cementitious materials and can further be used to encapsulate and contain any pollutant that may be associated therewith thus rendering the site containing the polluted building materials suitable for habitation.

4 Claims, No Drawings

ENCAPSULATING SEALANT FOR THE TREATMENT AND PRESERVATION OF BUILDING MATERIALS

BACKGROUND OF THE INVENTION

1. Field of the Invention

This invention relates to coating compositions useful in treating and protecting the surfaces and interiors of building materials, for example. Specifically, this invention relates to coating compositions that can be used to preserve the surfaces and interiors of cementitious materials. Still more specifically, this invention relates to coating compositions that can be applied topically to buildings and to building sites and which can encampsulate any pollutants contained therein, preventing their migration therefrom.

2. Description of the Prior Art

There are a number of prior art references that describe various compositions useful in treating the surfaces of buildings and building materials, e.g. cementitious materials. These references coat the surface of these materials ostensibly to improve the life of said materials and to prevent them from imbibing and passing moisture, for example. None of these prior art references describe a mixture of potassium silicates which can, as will be described herein, be applied to a whole host of construction materials and which not only will improve the surfac thereof but which will prevent the possible migration of any pollutants contained therein.

SUMMARY OF THE INVENTION

It is therefor an object of this invention to provide a coating composition which can be used to coat construction and building materials, for example, and which will improve the surface thereof. It is also an object of this invention to provide a coating composition that can be used to encapsulate any pollutants that may be contained in and around said building materials and which will prevent the migration of said pollutants therefrom.

These and other objects are achieved by providing a coating composition for building materials which is prepared by combining aqueous mixtures of potassium silicates comprising the following:

A. a solution of about 9.05% $K_2O$ and 19.9% $SiO_2$ with a viscosity of between 7 and 10 cps;
B. a solution of about 8.5% $K_2O$ and 20.8% $SiO_2$ with a viscosity of between 30 and 65 cps;
C. a solution of about 12.5% $K_2O$ and 26.3% $SiO_2$ with a viscosity of between 850 and 1200 cps;

and, adding thereto a catalytic amount of a material comprising an aqueous saturated solution of $Na_2B_4O_7.10H_2O$ having a small amount of a dispersing agent contained therein.

When this coating composition is applied topically to various building materials, especially to cementitious materials, for example, it serves to protect the surface thereof from the effects of weather, such as that caused by aerial oxidation, for example. In addition, if any pollutants are present in and around said building material, treatment with the coating composition of this invention will encapsulate said pollutants and prevent them from migration thus rendering the site containing these building materials suitable for human habitation.

DETAILS OF THE INVENTION

In the practise of this invention I prefer to mix the potassium silicates of varying viscosities together before I add the catalyst thereto. The solution of silicates is conventionally diluted with a minor amount of water to prevent any self catalyzation of the mixture. Then, the catalyst is added just before the composition is used to coat building materials for the purposes described. This prevents the solution from becoming too viscous and aids in the application thereof. A most preferred coating composition comprises a mixture of potassium silicates as follows:

| Ident. | Amt. (%) | Ingredients | Amt. (gals.) |
|---|---|---|---|
| K-88 | 25 | 9.05% $K_2O$ and 19.9% $SiO_2$ | 12.5 |
| K-1 | 50 | 8.30% $K_2O$ and 20.8% $SiO_2$ | 26.0 |
| K-6 | 25 | 12.5% $K_2O$ and 26.3% $SiO_2$ | 12.5 |

As measured, the preferred ingredients have the following viscosities and pH:

| Ident. | Viscosity (cps) | pH |
|---|---|---|
| K-88 | 7 | 11.5 |
| K-1 | 40 | 11.3 |
| K-6 | 1150 | 13.5 |

After these solutions are thoroughly blended to yield a clear, semi-viscous solution, a small amount of water (about 4 gallons, for example) is added thereto. Then, just prior to use, 2 gallons of a saturated solution containing about 8 oz. of $Na_2B_4O_7.10H_2O$—hereinafter called "borax"—per gallon of water and also containing a minor amount of a dispersant, e.g. glycerin, is added thereto. The saturated solution of borax is made up at about 100°-104° F. Since this borax solution catalyses the silicate mixture it should be used within about 6 hours, 4 hours preferred, since the now translucent mixture will become too viscous for use after that period of time. The amount of K-88 and K-6 can vary between 20-30% respectively of the total composition but it is preferred that the K-1 always be about 50% of said solution. Thus, the coating composition of this invention can contain 20-30% of K-88 and 20-30% of K-6 and 50% of K-1.

The catalyzed coating composition can be applied to the surfaces of building materials in any of a host of fashions. I prefer that cementitious materials be coated since they suffer from a number of degredation processes found in the atmosphere and they are the most difficult to protect and preserve. By cementitious material I mean materials such as cement, concrete, blocks of all types, bricks, masonry, stucco, marble, sheetrock, asbestos board, adobe and even earthen materials. The coating composition is preferably applied as a spray but it can be put down with brush, roller, swab or any of the various conventional methods. When the coating composition is applied topically to the surfaces of the building materials the surfaces are usually dry to the touch within about 4 hours at about 70° F. and reach a maximum cure at about 24 hours at the same temperature yielding a glossy surface thereon.

The coating composition of this invention is not limited to the coating of cementitious materials. Surfaces of wood, dirt, asbesto, board, among others, can be treated effacaciously using this compositlion. The surfaces will be rendered either fireproof, in the case of wood, or weather resistant, in the case of the other materials, by this treatment. More importantly, however, when any pollutants are present in and around the building materials as described, treatment by the coating composition of this invention results in an encapsulation thereof. Pollutants such as PCB (p-cholorbiphenyls) and dioxin (2,3,7,8-tetrachlorodibenzo-p-dioxin) are among those commonly heard in the news these days. However, other contaminants and pollutants such as the chemical insecticide cholorodane which is used to kill termites and other pests, also are known to cause problems to the user. Also to be mentioned here are furans. If any of these or other pollutants are present in and around the building materials, treatement with the coating composition of this invention will encapsulate said pollutants and effectively remove them from the living or working area. Additionally, further migration of these pollutants is effectively stopped.

The pollutants mentioned above are normally contained in a chemical spill or accident of some type. For example, some spills have occurred accidentally such as the spraying of dioxin containing oils on the surface of dirt roads in order to hold down the dust. Other spills have occured by the degration of other chemicals such as that known as "Agent Orange" and other defoliants and insecticides. Still other sources of the pollutants have come from the so-called "dumps" where nefarious individuals have attempted to dispose of chemical wastes and the like. In any case, this is a serious problem and there is a pressing need to have an easy and cheap method for effectively neutralizing or containing these contaminants and pollutants and thus rendering the site suitable for human habitation. A simple treatment of the site or the building materials and walls with the coating composition of this invention as described herein, will tie up many of these pollutants and effectively remove them from said site.

This invention will now be illustrated by the following examples.

EXAMPLE 1

The coating composition was prepared from a mixture of the following, aqueous materials:
  A. K-88, 9.05% $K_2O$ and 19.9% $SiO_2$, with a viscosity of 7 cps, and a pH of 7, sold by PQ Corporation, Valley Forge, PA. as KASIL ®-88-12.5 gallons.
  B. K-1, 8.3% $K_2O$ and 20.8% $SiO_2$, with a viscosity of 40 cps, and a pH of 11.3, sold by PQ Corporation of Valley Forge, PA. as KASIL ®-1-26.0 gallons.
  C. K-6, 12.5% $K_2O$ and 26.5% $SiO_2$, with a viscosity of 1150 cps and a pH of 11.7. sold by the PQ Corporation of Valley Forge, PA. as KASIL ®-6-12.5 gallons.

Solutions 1, 2 and 3 were thoroughly mixed and 4 gallons of water added thereto. Then, 2 gallons of a saturated solution of borax, made by stirring 48 oz. of borax in 2 gallons of water and decanting off the supernatant liquid after equilibrating with the borax at 100°–104° F. and additionally containing 12 oz. of glycerol to act as a surfactant, was added to the above mixture with stirring. This, then, yielded a total of 55 gallons of a translucent, semi-viscous material.

Samples of masonry block, patio block and concrete block as well as pieces of marble slabs were then treated with this coating composition by coating with a paint roller. These samples were then air dried to yield a clear, hard, glossy finish thereon. For control purposes, samples of these same materials were kept without any treatment. All samples were then subjected to a test known as "Efflorescence Resistance", under Federal Specification SS-W-1100. In this test, a coated block or element, along with its respective control, is placed in ½ inches of a 5% sodium sulfate solution and the amount of efflorescence formed on the surfaces thereof is measured. Efflorescence is observed as a "blooming" or "powderiness" on the surface of a cementitious material and this is well correllated to a decaying of the surface thereof under normal, atmospheric conditions. Large amounts of efflorescence can naturally be caused by exposure of the building surface to the natural envronment including the pollutants carried therein. This test has been demonstrated to act as an accellerated study of this effect.

All of the materials treated with the coating composition of this invention showed no efflorescence in this test while the uncoated controls showed considerable efflorescence or decay on the sides of the blocks and up to 1 inch within the upper surface.

EXAMPLE 2

Samples of construction grade lumber were brush coated with the coating composition of Example 1 and subjected to ASTM-D-1360, "Fire Retardency of Paints (Cabinet Method)". This test was developed to determine the resistance of a material to the effects of fire. Control samples without the coating composition were also subjected to this test. The coated samples, dried for 48 hours prior to testing, showed very little charring while the controls were almost consumed. Thus, the coating composition of this invention also served as an effective, cheap and easily applied fire retardant for combustible construction materials.

EXAMPLE 3

A sample of cement block was treated with a known amount of the pollutant AROCLOR 1242, a PCB. A portion of this block was then coated with the coating composition of Example 1 and allowed to dry for 72 hours. Another application was made and allowed to dry for 48 hours. A sample of fliter paper that had been wet with hexane (a known solvent for PCB) was then used to wipe the surface of the block. The wipes were then extracted with hexane and this extract was analysed for PCB using a gas chromatograph under the following conditions:
  Column 10"X14", 1.5% OV-17/11.95% QF-1 on 80/100 WHP.
  Column temperature: 200° C.
  Electron Capture Detector Temperature: 250° C.
  Injection Port Temperature: 250° C.
  Detection Limit of PCB: <0.03 $\mu g/cm^2$.

A standard of the PCB was also injected into the gas chromatograph for reference purposes. No PCB was detected from the material used to wipe the coated surfaces of the blocks containing the PCB indicating that the coating composition of this invention was effective in preventing the leaching or migration of the PCB therefrom.

EXAMPLES 4–6

The coated block of Example 3 was held for 1 month (Example 4), 5 months (Example 5) and 7 months (Example 6) and the test described in Example 3 was repeated at these intervals. No PCB was detected at any time during these tests indicating that the coating composition of this invention was effective in stopping the further migration of the PCB from the treated block over a period of time.

EXAMPLE 7

A sample of the block from Example 3, which had been so successfully tested in Examples 4-6, was then ground up and the ground up portion extracted with hexane to attempt and recover the PCB. The extracts were examined by gas chromatograph as described in Example 3. No PCB was detected indicating that the PCB had either been tied up fully by the coating composition of this invention or that it had been chemically altered thereby rendering it un-detectable as PCB.

These last few examples demonstrate how effective this rather simple coating composition is in reducing a known contaminant, PCB, from becoming a further problem. The composition was also effective in eliminating or substantially reducing other contaminants such as dioxin and cholordoane. It could not have been predicted that such a mixture would be as effective in both increasing the life of building materials or in reducing contaminants contained therein.

I claim:

1. An aqueous coating composition for building materials comprising a mixture of potassium silicates of various viscosities made by mixing the following:

A. a solution of about 9.05% $K_2O$ and 19.5% $SiO_2$ with a viscosity of between 7 and 10 cps;
   B. a solution of about 8.3% $K_2O$ and 20.8% $SiO_2$ with a viscosity of between 30 and 65 cps;
   C. a solution of about 12.5% $K_2O$ and 26.3% $SiO_2$ with a viscosity of between 650 and 1200 cps; and
   adding thereto a minor amount of a catalyst solution comprising a saturated, aqueous solution of $Na_2B_4O_7.10H_2O$ having a lesser amount of a dispersing agent contained therein.

2. The composition of claim 1 wherein solution A amounts to 20-30% of the overall composition, solution B amounts to 50% of the overall composition and solution C amounts to 20-30% of the overall composition.

3. The composition of claim 1 wherein:
   A has a viscosity of 7 cps, a pH of 11.5 and is 25% of the overall composition;
   B has a viscosity of 40 cps, a pH of 11.3 and is 50% of the overall composition; and
   C has a viscosity of 1150 cps, a pH of 11.7 and is 25% of the overall composition.

4. The composition of claim 3 wherein 12.5 gallons of A, 26.0 gallons of B and 12.5 gallons of C are mixed, 4 gallons of water added thereto and wherein said catalyst solution contains about 16 oz. of $Na_2B_4O_7.10H_2O$ per 2 gallons of water and is added to said mixture and wherein said dispersing agent is glycerol in an amount of 12 oz. of said compostion.

* * * * *

UNITED STATES PATENT AND TRADEMARK OFFICE
CERTIFICATE OF CORRECTION

PATENT NO. : 4,475,951
DATED : October 9, 1984
INVENTOR(S) : Lincoln R. Davis

It is certified that error appears in the above-identified patent and that said Letters Patent is hereby corrected as shown below:

On the title page item (73) should read

--Lopat Enterprises, Inc., Asbury Park, N. J.

Signed and Sealed this

Second Day of July 1985

[SEAL]

Attest:

DONALD J. QUIGG

Attesting Officer     Acting Commissioner of Patents and Trademarks